Patented Nov. 23, 1943

2,334,782

UNITED STATES PATENT OFFICE 2,334,782

PROCESS FOR PREPARATION OF DISECONDARY DIAMINES

Elmore Louis Martin, Wilmington, Del., assignor to E. I. du Pont de Nemours & Company, Wilmington, Del., a corporation of Delaware No Drawing. Application April 29, 1941, Serial No. 390,999

9 Claims. (Cl. 260—583)

This invention is concerned with the preparation of disecondary diamines from organic dihalides.

There has not hitherto been available a generally satisfactory method for the preparation of disecondary diamines in good yield and of adequate purity. Certain types of disecondary diamines have hitherto not been made.

This invention has as an object therefore the provision of a method for preparing disecondary diamines in good yield. A further object is a method of preparing these diamines in a pure state. Another object comprises certain new disecondary diamines. Other objects will appear hereinafter.

These objects are accomplished by the following invention wherein one mole of an organic dihalide wherein the halogen atoms are of atomic weight of at least 20, are attached through methylene groups to a divalent organic radical free from groups reactive with halogen and amino groups, and are separated by a chain of at least six atoms, is reacted under essentially anhydrous conditions with at least twenty moles of a primary monoamine in which the amino group is attached through aliphatic carbon to an organic radical free from groups reactive with the amino and halogen groups.

In the preferred mode of operation of the process of this invention an organic dihalide, in which the halogen atoms are chlorine, bromine or iodine, but preferably chlorine or bromine, are attached to methylene groups, and are separated by a chain of at least six atoms, is placed in a reaction vessel equipped with devices for stirring, heating, and temperature control. To the organic dihalide is added the primary aliphatic monoamine in the proportion of at least twenty and preferably forty moles of primary monoamine to each mole of organic dihalide, that is, at least ten and preferably twenty moles of the primary monoamine are provided for each equivalent of halogen. The reaction vessel is sealed and the mixture is stirred continuously at room temperature for about eight hours. The mixture is then stirred for an additional sixteen hours, during which time the temperature of the mixture is maintained at a temperature between 50° and 100° C. In many cases the reaction between the organic dihalide and the primary amine is exothermic, and in the case of low boiling amines such as ethylamine and methylamine the heat generated by the reaction is sufficient to build up considerable pressure within the apparatus. The initial eight hour period at room temperature is employed to permit the reaction to take place slowly at first and to permit dissipation of the heat generated without building up excessively high internal pressures. During the sixteen hour heating period the reaction is driven substantially to completion by heating.

The reaction may also be carried out by an alternative and highly desirable method, which may be more convenient in some cases than that above, depending upon the reactants and equipment available. In this alternative mode of operation the selected primary amine is placed in a vessel similar to that already described and heated to the temperature at which the reaction is to be carried out. The organic dihalide (about one-fifth mole for each mole of primary amine) is added very slowly during a major portion of the reaction time, while the reaction mixture is stirred and maintained at the selected temperature. Although the proportions of the reactants are about five moles of primary amine for each mole of dihalide, in the practice of this alternative method, the dihalide is added sufficiently slowly to the primary amine to maintain a molar ratio of primary amine to dihalide in the reaction mixture throughout the reaction time of at least twenty to one.

After the reaction has been performed according to either of the modes of operation already described, the excess primary amine is removed from the reaction mixture by distillation. To the residue which remains (consisting principally of the mixed hydrogen halides of the disecondary diamine and primary monoamine), an excess of caustic is added and the mixture is extracted repeatedly with a water-isoluble solvent for the diamine, such as benzene. The extracts are combined and dried with an alkaline drying agent, such as solid caustic. The solvent is removed from the dried extract by distillation, and the residual diamine is purified by fractional distillation, or by crystallization from inert solvents.

The more detailed practice of the invention is illustrated by the following examples, wherein parts given are by weight. There are of course many forms of the invention other than these specific embodiments.

*Example I*

Monomethylamine (120 parts or four mole equivalents) and hexamethylene dibromide (24.4 parts or 0.1 mole equivalent) are mixed and sealed in a vessel which is maintained at 50° C. for 16 hours. The vessel is then opened and excess monomethylamine is permitted to evaporate.

After removal of excess monomethylamine, the residue is treated with an excess of strong aqueous potassium hydroxide. The mixture separates into two layers and the upper layer is removed and saved. The lower (aqueous) layer is extracted three times with benzene and the benzene extracts are combined with the first upper layer which separated. After having been dried over solid potassium hydroxide the solution is concentrated and the residue which remains after boiling off the benzene is purified by fractional distillation. The yield of N,N'-dimethylhexamethylenediamine is 9.9 parts or 69% of theory; B. P., 108–109° C./25 mm.; M. P. 17° C.

*Example II* p-Xylylene dichloride (250 parts or 1.43 mole equivalents), toluene (3500 parts), and anhydrous monomethylamine (6800 parts, about 220 mole equivalents) are placed in an autoclave equipped with heating and stirring devices. The autoclave is then sealed and the mixture is stirred at room temperature for 8 hours, during which time the pressure rises to 30 lbs./sq. in. gauge, and for 16 additional hours at 50° to 65° C., during which the pressure rises to 195 lbs. sq. in. gauge. The autoclave is opened and the excess monomethylamine is permitted to evaporate. The reaction product, a crystalline mass, is separated from the toluene by filtration, and treated with 500 parts of water and 1000 parts of technical caustic soda. The N,N' - dimethyl - p - xylylenediamine which is liberated by this procedure is extracted by four washings with benzene, 500 parts of benzene being used for each extraction. The benzene extracts are combined, and dried by distilling off the water as an azeotropic mixture with benzene. The benzene is removed from the residue by distillation and the product is purified by fractional distillation. The purified product, N,N'-dimethyl-p-xylylenediamine (153 parts or a yield of 65% of theory) boils at 135° C. (corr.) at 10 mm. of mercury and is characterized by the following data: Neutral equivalent: found, 82.25; calculated 83.13. Per cent nitrogen: found, 17.35; calculated 16.85. $d_4^{25}$, 0.9723; $N_D^{25}$, 1.5328.

*Example III*

A mixture of 60 parts or about 2 mole equivalents of monoethylamine and 15 parts or about 0.05 mole equivalent of decamethylene dibromide is heated in a sealed autoclave at 55° C. for 16 hours. The reaction mixture is treated as has been described in Example II. The purified diamine, N,N' - diethyl - decamethylenediamine (8.6 parts or a 75% yield) boils at 128° C. under 2 mm. mercury pressure and has a neutral equivalent of 114.5, as compared with a calculated value of 114.2.

*Example IV*

Hexamethylene dibromide (244 parts or 1 mole equivalent) and isobutylamine (1820 parts or about 25 mole equivalents) are mixed and heated in an autoclave at 100° C. for 16 hours. The product, N,N'-diisobutylhexamethylenediamine is isolated from the reaction mixture by the method described in Example II. The N,N'-diisobutylhexamethylenediamine (220 parts or a yield of 96.5%), B. P., 108–110° C./2 mm., has a neutral equivalent of 114.2, as compared with the calculated value of 114.2.

*Example V*

Triglycol dichloride (360 parts, or about two mole equivalents) and anhydrous monoethylamine (3600 parts, or about eighty mole equivalents) are sealed in an autoclave equipped with heating and stirring devices. The mixture is stirred at room temperature for eight hours, and for eight additional hours at 50° C., during which the pressure rises to 70 lbs./sq. in. gauge. The autoclave is opened and the excess ethylamine is distilled off. The residue in the autoclave is treated with 600 parts of water and 1000 parts technical sodium hydroxide. The N,N'-diethyltriglycoldiamine liberated by this procedure is extracted by four washings with benzene, 600 parts benzene being used for each extraction. The benzene extracts are combined and dried over solid caustic soda, the benzene is removed by distillation and the diamine is purified by fractional distillation. The purified product, N,N'-diethyltriglycoldiamine (245 parts or a yield of 63% of theory) boils at 148–148.5° C. at 22 mm. and is characterized by the following data: Neutral equivalent: found, 101.9; calculated, 102. Per cent nitrogen: found, 14.02; calculated, 13.7. $d_4^{25}$, 0.9124; $N_D^{25}$, 1.4420.

*Example VI*

Triglycol dichloride (906 parts or 4.85 mole equivalents) and anhydrous monomethylamine (6342 parts or about 205 mole equivalents) are sealed in an autoclave equipped with heating and stirring devices. The mixture is stirred at room temperature (about 10° C.) for eight hours, during which time the pressure rises to 25 lbs./sq. in. gauge and for 16 additional hours at 50° C., during which the pressure rises to 110 lbs./sq. in. gauge. The autoclave is opened and the excess monomethylamine is distilled off. The N,N'-dimethyltriglycoldiamine is obtained from the residue left in the autoclave in the manner described in Example V above. The purified N,N'-dimethyltriglycoldiamine,

CH₃NHCH₂CH₂—O—CH₂CH₂—

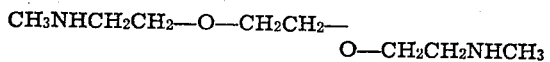

(895 parts, or 96% of theory) boils at 115° C. at 12 mm. Neutral equivalent: found, 86.7; calculated, 88.1. $N_D^{25}$ 1.4438; $d_4^{25}$ 0.9398.

N,N'-diethyl-p-xylylenediamine, $d_4^{25}$ 0.9395, $N_D^{25}$ 1.5162, B. P. 102°/2 mm. is similarly prepared in 81% yield from one mole p-xylylene dichloride and forty moles monoethylamine. The product has a neutral equivalent of 97.1 while the calculated value is 96.

N,N' - dimethyldecamethylenediamine, $N_D^{50}$ 1.4411, B. P. 118°/2 mm. is similarly prepared from one mole 1,10-dibromodecane and forty moles monomethylamine. The product has a neutral equivalent of 100.5, while the calculated value is 100.

N,N'-diethylhexamethylenediamine, $d_4^{25}$ 0.8215, $N_D^{25}$ 1.4439, B. P. 110°/12 mm. is similarly prepared in 93% yield from one mole hexamethylene dibromide and forty moles monoethylamine. The product has a neutral equivalent of 86.7, while the calculated value is 86.

N,N'-di-n-amylhexamethylenediamine, B. P. 133°/1 mm. is similarly prepared in 77% yield from one mole hexamethylene dibromide and forty moles mono-n-amylamine. The product has a neutral equivalent of 127, while the calculated value is 128.

N,N' - dibenzylhexamethylenediamine, $d_4^{25}$ 0.9861, $N_D^{25}$ 1.5422, B. P. 220°/2 mm. is similarly prepared in 60% yield from one mole hexamethylene dibromide and forty moles monobenzylamine. The product has a neutral equivalent of 148.4, while the calculated value is 148.

In the process of this invention the primary monoamine is reacted with the dihalide in such proportion that there are always present in the reaction mixture at least twenty moles of the primary monoamine per mole of the dihalide. The use of a large excess of the primary amine is important in order to reduce to a minimum the formation of by-products including tertiary amines and polyimines and to prevent serious reductions in yield of the desired diamine. A ratio of primary amine to organic dihalide greater than that described is satisfactory and still further decreases the formation of by-products. However, the use of more than forty moles of the primary amine for each mole of dihalide is economically unattractive.

Any anhydrous, inert organic solvent may be used in the process. When the dihalide is at least moderately soluble in the primary amine the solvent is not required. However, when the organic dihalide is insoluble or only slightly soluble in the primary amine it is important that an anhydrous, inert organic solvent for both reactants be employed. In Example II, toluene is employed because it is an excellent solvent for the primary amine and the organic dihalide which are only slightly soluble in one another. The use of a solvent is also desirable when the primary amine melts above the temperature at which the reaction is to be carried out. Other solvents include xylene, benzene, dioxan, diethyl ether, bidutyl ether, cyclohexane, and petroleum ether.

Although the time of the reaction in the preferred mode of operation is approximately 24 hours, this varies within wide limits for different reactants. For instance, in the case of monoethylamine and hexamethylene dibromide, the reaction proceeds to substantial completion at room temperature within 2 hours; in other instances the reaction requires longer periods of time and higher temperatures for completion. Moreover, the temperature at which the reaction proceeds at a fairly rapid rate varies greatly depending upon the reactants. In general, temperatures from 50° to 100° C. are most satisfactory, and at the higher temperatures shorter time is required. Stirring is used whenever necessary to keep the reaction mixture homogeneous, or to impede the separation of one reactant which may be only moderately soluble. When no separation occurs stirring is not necessary, but does no harm.

In the process of the present invention a yield of at least 50% of the theory of a disecondary diamine will be obtained when any primary aliphatic monoamine including n-propylamine, isopropylamine, n-butylamine, isobutylamine, n-amylamine, isoamylamine, hexylamines, heptylamines, stearylamine, dodecylamine, octylamine, cyclohexylamine, cylopentylamine, methoxybenzylamines, alkylbenzylamines, benzhydrylamine, cetylamine, 2-phenylethylamine, decylamine, alkylcyclohexylamines, cyclohexylmethylamine, cyclohexylethylamine, and cyclohexylpropylamine is reacted under the conditions of the process of this invention with any organic dihalide in which the halogens are of atomic weight above 20, are attached to methylene groups, and are separated by a chain of at least six atoms, including hexamethylene dihalides heptamethylene dihalides, octamethylene dihalides, nonamethylene dihalides, decamethylene dihalides, hendecamethylene dihalides, dodecamethylene dihalides, tridecamethylene dihalides, tetradecamethylene dihalides, hexadecamethylene dihalides, octadecamethylene dihalides, bis(3-halogenopropyl)ether, bis(4-halogenobutyl)ether, 1,8-dihalogeno-3,6-dioxaoctane, 1,10-dihalogeno-4,7-dioxadecane, 1,9-dihalogeno-3,7-dioxa-nonane, p-bis(halogenomethoxy)benzene, m-bis(halogenomethoxy)benzene, p-bis(2-halogenoethoxy)benzene, m-bis(2-halogenoethoxy)benzene, p-bis(2-halogenoethyl)benzene, m-bis(2-halogenoethyl)benzene, p-bis(halogenomethyl)benzene, p-bis(3-halogenopropyl)benzene, m-bis(3-halogenopropyl)benzene, 1,3-bis(2-halogenoethyl)cyclopentane, 1,3-bis(2-halogenoethyl)-cyclohexane, 1,4-bis(2-halogenoethyl)cyclohexane, 1,4-bis(halogenomethyl)cyclohexane, and their C-alkyl derivatives, examples of which are 2-methylhexamethylene dihalide, 2-amyl-p-bis(halogenomethoxy)-benzene, and 2-ethyl-p-bis(2-halogenoethyl)-benzene. The above dihalides may have the two halogens the same or different and they may be chlorine, bromine, or iodine. Thus ω-bromohexamethylene iodide, ω-chlorodecamethylene bromide, ω-chloropentamethylene iodide, hexamethylene diiodide may be employed.

A preferred phase of this invention is that wherein the amine is a primary aliphatic monoamine having the amino group attached through aliphatic carbon to a monovalent radical which is free from groups reactive with halogen attached to aliphatic carbon or with the amino group. The monovalent radical is preferably hydrocarbon and of course joined to the amino group through aliphatic carbon. It may, however, be interrupted by or substituted by the ether group. Primary alkylmonoamines are highly preferred. In this preferred phase of the invention the dihalide has its two halogen atoms attached through methylene groups to a divalent radical which is likewise free from groups reactive with the amino group and halogen attached to aliphatic carbon and which is hydrocarbon or hydrocarbon containing an ether group or groups.

The disecondary diamines which are prepared as described in this invention are useful in organic syntheses. Some of the disecondary diamines are useful as intermediates for dyestuffs preparation. The diamines are especially useful as intermediates for the preparation of polyamides. Polyamides and interpolyamides which have been prepared in part from disecondary diamines possess extremely broad utility as agents which, when melt-blended with the common polyamides, confer unusual pliability and softness upon the products.

In the most useful aspect of this invention, a dihalide having its two halogen atoms attached through methylene groups to a divalent hydrocarbon radical containing at least one ether oxygen in the chain separating the halogen atoms, which chain is at least six atoms in length, for example, bis(3-chloropropyl)ether, bis(4-bromobutyl)ether, 1,8-dichloro-3,6-dioxaoctane, 1,10-dichloro-4,7-dioxadecane, etc., is reacted with at least twenty moles, per mole of dihalide, of a primary, aliphatic saturated monoamine of up to four carbon atoms. The disecondary diamines obtained from these ether-type dihalides and these short chain diamines are particularly valuable, since it has been found that reacting them with dicarboxylic acids leads to polyamides of unusual and outstanding properties. When melt-blended with other polyamides, such as polyhexamethyleneadipamide, these "tertiary" polyamides exert a powerful plasticizing effect and also greatly improve the receptivity of the polyamide blends for acid, direct and vat dyes.

The above description and examples are intended to be illustrative only. Any modification of or variation therefrom which conforms to the spirit of the invention is intended to be included within the scope of the claims.

What is claimed is:

1. Process of preparing disecondary diamines which comprises reacting under anhydrous conditions a primary aliphatic monoamine, wherein the amino group is attached through aliphatic carbon to an organic radical free from groups reactive with the amino group and halogen, with an organic dihalide wherein the halogen atoms are of atomic weight of at least twenty, are attached to methylene groups and are separated by at least six atoms, the primary amine being present in the reaction mixture throughout the reaction in the amount of at least twenty moles per mole of the dihalide.

2. Process of claim 1 wherein the reaction temperature is 50–150° C.

3. Process of preparing disecondary diamines which comprises reacting under anhydrous conditions at 50–150° C. a primary monoamine having the amino group attached through aliphatic carbon to a radical of the class consisting of hydrocarbon radicals, hydrocarbon radicals interrupted by ether groups and hydrocarbon radicals substituted by ether groups with an organic dihalide wherein the halogen atoms are of atomic weight above 20, are attached through methylene groups to a bivalent radical of the class consisting of hydrocarbon radicals, hydrocarbon radicals interrupted by ether groups and hydrocarbon radicals substituted by ether groups and are separated by a chain of at least six atoms, the primary monoamine being present in the reaction mixture throughout the reaction in the amount of at least twenty moles per mole of the dihalide.

4. Process of preparing an N,N'-dialkyltriglycoldiamine which comprises reacting under anhydrous conditions at 50–150° C. a primary alkylamine with a triglycol dihalide wherein the halogens have an atomic weight of at least 20, the primary alkylamine being present in the reaction mixture throughout the reaction in the amount of at least twenty moles per mole of the dihalide.

5. Process of preparing an N,N'-dialkyl-p-xylylenediamine which comprises reacting under anhydrous conditions at 50–150° C. a primary alkylamine with a p-xylylene dihalide wherein the halogens have an atomic weight above 20, the primary alkylamine being present in the reaction mixture throughout the reaction in the amount of at least twenty moles per mole of the dihalide.

6. Process of preparing an N,N'-dialkylpolymethylenediamine which comprises reacting under anhydrous conditions at 50–150° C. a primary alkylamine with a polymethylene dihalide wherein the halogens have an atomic weight above 20 and are separated by a chain of at least six carbons, the primary alkylamine being present in the reaction mixture throughout the reaction in the amount of at least twenty moles per mole of the dihalide.

7. Process of preparing N,N'-dimethylhexamethylenediamine which comprises reacting under anhydrous conditions forty moles monomethylamine at 50° C. for sixteen hours with one mole hexamethylene dibromide.

8. N,N'-dimethyltriglycoldiamine.

9. Process of preparing disecondary diamines which comprises reacting at least 20 moles, per mole of dihalide, of a primary alkylamine under anhydrous conditions at 50–150° C. with an organic dihalide wherein the halogen atoms are of atomic weight above 20 and are separated by a chain of at least six atoms consisting of an alternation of bivalent hydrocarbon and bivalent ether oxygen radicals and having terminal methylene groups.

ELMORE LOUIS MARTIN.